Sept. 14, 1943.   A. E. DE LORIMIER ET AL   2,329,187
METHOD AND MEANS FOR LOCALIZING FOREIGN BODIES
Filed June 19, 1941   2 Sheets-Sheet 1
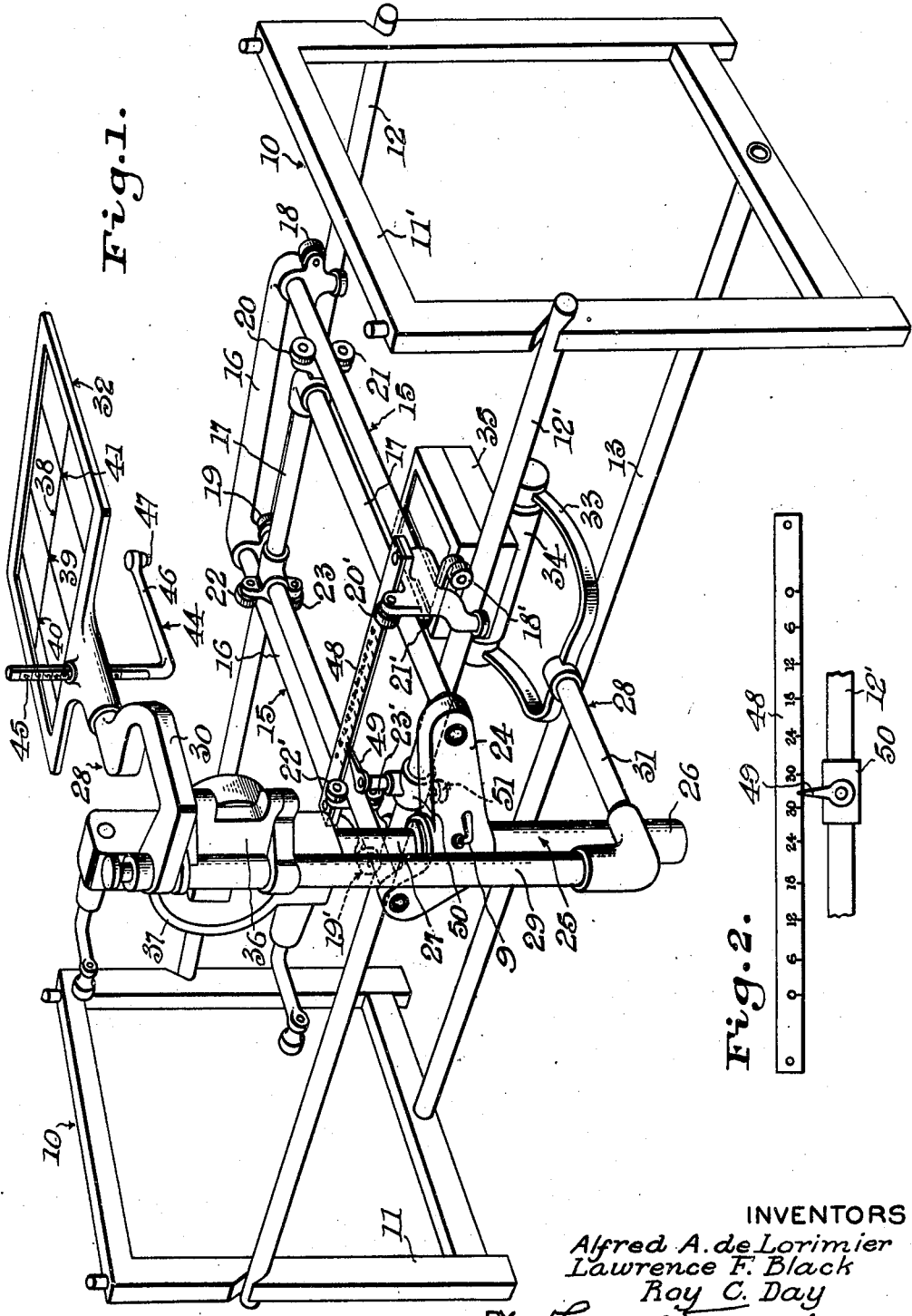
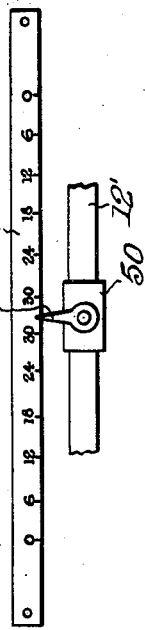
INVENTORS
Alfred A. de Lorimier
Lawrence F. Black
Roy C. Day
BY
ATTORNEY

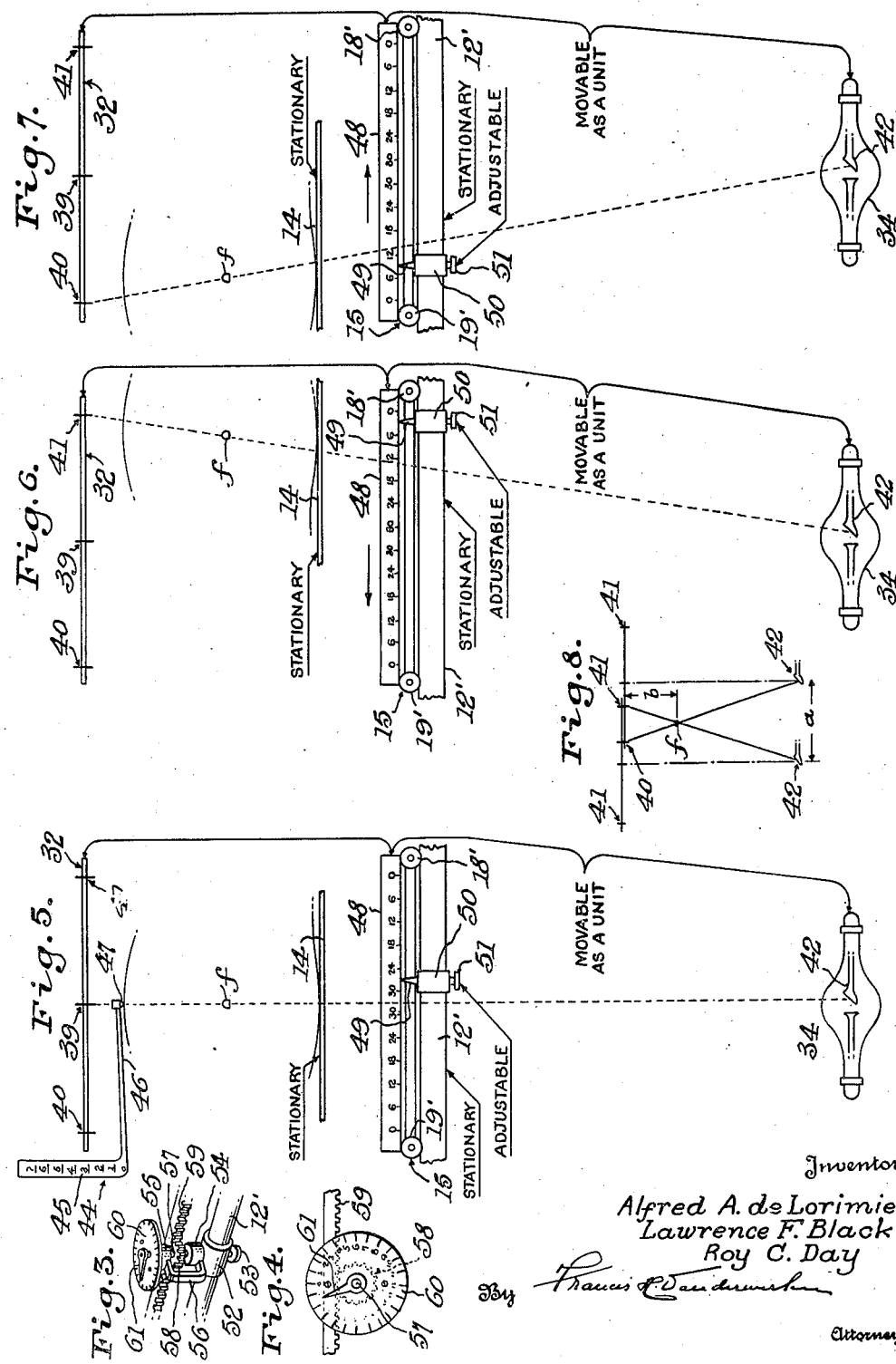

Patented Sept. 14, 1943

2,329,187

UNITED STATES PATENT OFFICE 2,329,187

METHOD AND MEANS FOR LOCALIZING FOREIGN BODIES

Alfred A. De Lorimier, Washington, D. C., Lawrence F. Black, Denver, Colo., and Roy C. Day, Fort Knox, Ky.

Application June 19, 1941, Serial No. 398,816

7 Claims. (Cl. 250—59)

(Granted under the act of March 3, 1883, as amended April 30, 1928; 370 O. G. 757)

The invention described herein may be manufactured and used by or for the Government for governmental purposes, without the payment to us of and royalty thereon.

This invention relates generally to the localization of foreign objects, but more particularly it is directed to a method and means for determining by Roentgen rays the location and distance beneath the surface of the skin, of foreign objects invisibly imbedded within the body of a patient.

The device is especially useful for surgeons in locating bullets or other hard or comparatively impermable bodies or growths in organic substance, but it may also be employed for a variety of other purposes where the object sought is surrounded by material which is permeable to Roentgen rays.

One object of the invention is to provide a simple and accurate method and an inexpensive and easily operated apparatus for determining the location of foreign bodies by X-ray examination.

Another object is to provide an apparatus for determining the location of foreign bodies in which a minimum of X-radiation and manipulation is required.

Another object is to provide a device which obviates the need of loose calipers and measuring sticks in determining the location of foreign bodies.

Still another object of the invention is to provide an instrument of the class described which incorporates geometric principles to which simple scale construction could be adapted in case of breakage or loss of any of the parts.

Another object of the invention is to provide a device for localizing foreign bodies in which the depth of said bodies is measured beneath the skin of the patient, rather than beneath the fluoroscopic screen, and one in which a direct reading of such measurement may be obtained.

Referring more particularly to the accompanying drawings in which corresponding parts are indicated by similar reference characters:

Fig. 1 is a perspective view showing an assembly of the apparatus;

Fig. 2 is a top plan view of the measuring device;

Fig. 3 is a perspective view of a modified form of measuring device;

Fig. 4 is a top plan view of the measuring dial shown in Fig. 3;

Fig. 5 is a diagrammatic view showing the relative positions of the X-ray tube, the screen, and the foreign body when a shadow of the foreign body is cast on the central marker of the screen;

Fig. 6 is a diagrammatic view showing the relative positions of the X-ray tube, the screen, and the foreign body when a shadow of the foreign body is cast on the right hand marker of the screen;

Fig. 7 is a diagrammatic view showing the relative positions of the X-ray tube, the screen, and the foreign body when the shadow of the foreign body is cast on the left hand marker;

Fig. 8 is a diagrammatic view showing a geometric outline of the rays from the target and the shadows cast by the foreign body.

Briefly stated, the method and apparatus by which the depth of the embedded object is obtained depends upon the measurement of the lineal movement of a carriage, upon which are mounted a screen and an X-ray tube so that rays from the tube cast shadows upon fixed points on the screen.

The device, which is primarily designed to serve the roentgenologist in the examination of patients, comprises a support 10 formed with rectangular or other suitable end members 11 and 11', to which are attached longitudinally extending tracks 12 and 12' and a longitudinal brace 13.

The tracks are adapted to extend on either side of and below a litter or other suitable support 14 on which the patient is reclined, as shown diagrammatically in Figs. 5, 6 and 7.

A carriage 15 which is mounted for longitudinal movement along the tracks 12 and 12', is formed with an outer rectangular frame 16 and an inner rectangular frame 17 which is mounted for lateral movement with respect to the outer frame. The outer frame is provided with guide rollers 18, 18' and 19, 19' which are adapted to engage the track 12 and 12'. The inner frame which is adapted for lateral movement within the outer frame, is provided with guide rollers 20, 21 and 22, 23, which engage the outer frame and the outer frame is provided with guide rollers 20', 21' and 22', 23', which engage the inner frame.

To the laterally movable inner frame of the carriage is attached a cross member 24 which functions as a bracket to support a vertically adjustable telescoping standard 25, formed with a lower tubular guide member 26 into which is slidably mounted a tubular member of smaller diameter 27, which may be set at any desired height by a screw 9. At the upper extremity of the inner member 27 is adjustably mounted a beam projecting unit comprising a support member 28, composed of central standard 29 which, for localization purposes, is retained in an upright position as shown in Fig. 1, and to which are attached an upper arm 30 and a lower arm 31 projecting at right angles to the central standard 29. The upper arm supports a screen 32 and to the lower arm is attached a yoke 33 which supports a shielded X-ray tube 34 and a shutter housing 35.

The central standard 29 of the beam projecting unit is attached to the upper telescoping member 27 by a bracket 36 provided with a rotating gear mechanism enclosed within a housing 37, which mechanism changes the position of the beam projecting unit when the device is used for purposes other than localizing foreign bodies.

The screen 32 which is supported by the upper arm 30 of the beam projecting unit is marked along a longitudinal line 38 with three cross lines, a central cross line 39 and two end cross lines 40 and 41, equally spaced from the central cross line. The central cross line is located directly above the target 42 of the X-ray tube 34 which is supported beneath the carriage 15 by the lower arm 31, as shown in Figs. 1 and 5.

A skin marker 44, provided with a scale 45 and an arm 46 supporting a marker tip 47, is attached to the screen 32, as shown in Fig. 1. This device is used for measuring the distance from the screen 32 to the skin of the patient, as shown in Fig. 5.

To the outer rectangular frame 16 of the carriage 15 is attached a longitudinally extending adjustably mounted scale 48, the graduations of which extend from zero markings at either end to the center as shown in Figs. 1 and 2. For indicating the extent of movement of the carriage 15 on the scale 48, a pointer 49 is provided which is attached to a sleeve member 50 slideably mounted on the track 12', the sleeve member being provided with a thumb screw 51 for locking the same in any desired position along the track 12'.

A modified form of measuring device adapted to indicate the longitudinal movement of the carriage, is illustrated in Figs. 3 and 4. This type of measuring device includes a sleeve member 52 which is slideably mounted on the track 12' and which may be locked in any position along the track by the thumb screw 53. Either attached to the sleeve member or formed integral therewith is a foot-step bearing 54 and a sleeve bearing 55 which are connected to a yoke 56. These bearing members support a shaft 57 to which is rigidly attached a pinion 58 adapted to engage a rack 59 attached to the carriage 15. To the upper surface of the sleeve bearing 55 is attached a dial 60 and to the upper end of the shaft 57 a pointer 61.

The pinion 58 is meshed with the rack 59 attached to the carriage in the same manner as the scale 48 in Fig. 1, so that movement of the carriage will be indicated on the dial.

In the operation of the device the patient is placed preferably in a reclining position on the litter or other suitable support 14 between the tracks 12 and 12', and the carriage 15 and beam projecting unit 28 adjusted until the shadow of the foreign object imbedded within the body of the patient falls upon the central cross mark 39 on the screen 32. The marker tip 47 of the skin marker 44 which may be formed as a brush and dampened with a coloring fluid, or formed of a marking substance, is then lowered until it touches the skin of the patient and the scale 45 read to determine the distance to be compensated for on the scale 48 of the carriage so that a direct reading may be made in determining the depth of object beneath the skin of the patient.

The carriage unit, which includes screen 32, tube 34 and scale 48 which are rigidly attached thereto, is then moved to the left until the shadow of the foreign object is projected on the cross lines at 41 as indicated in Fig. 6, and the pointer 49 moved along the scale 48 to the graduation indicating the distance between the screen and the skin as found on the scale 45 of the skin marker. In the example shown in Figs. 5, 6, and 7, this distance from the screen to the skin of the patient is indicated at the graduation on scale 45 three units from the zero marking. The pointer 49 is then set at three units from the zero marking at the left end of scale 48. The carriage is then moved to the right, as shown in Fig. 7, until the shadow of the foreign body is projected upon the cross lines indicated at 40 and the movement of the carriage noted upon the scale 48. It will be noted in Fig. 7 that the reading on the scale is at 9. This reading gives the measurement of the distance of the foreign body beneath the surface of the skin of the patient.

If the apparatus is equipped with the modified form of measuring device shown in Figs. 3 and 4, the operation thereof is performed in the same manner. The scale is compensated for distance of screen to patient by moving it along the track, and then locking it in a position from which the longitudinal measurement of the movement of the carriage is to be taken by tightening the thumb screw 53. In the movement of the carriage the rack 59, meshing with the pinion 58, rotates the pointer 61 over the graduated dial 60 to indicate the longitudinal distance that the carriage is moved between the points where the target of the tube casts shadows on cross lines 41 and 40.

In order to more fully understand the operation of the device, reference will be had to Fig. 8. Considering the operation of the device as described above, it will be noted that the point of origin of the X-rays is first placed directly beneath the foreign body so that the shadow of the foreign body is projected on the center cross lines 39 of the screen 32. This projection is shown in Fig. 5 by the straight line 42—33 from the source of X-rays at 42 through the foreign body to the central cross lines 39.

The carriage unit including the screen 32, tube 34 and scale 48 is then moved to the left until the shadow of the foreign body f is projected on the cross-lines 41 as shown in Fig. 8. The straight line from the source of X-rays through the foreign body f to the cross lines 41 is shown by the line 42—41 in Fig. 8.

It will be noted from Fig. 8 that the nearer the foreign body f is to the screen the farther it is necessary to move the carriage in order to project its shadow upon the cross lines 41 (J in Fig. 8), and that the distance that it is necessary to move the carriage is indirectly proportioned to the distance of the foreign body from the screen.

While the carriage is still in its left-hand position with the shadow of the object projected on cross-lines 41 as shown in Fig. 8, the pointer 49 is moved toward the right end of the scale 48 and stopped at the graduation, adjacent the right-hand end, designating the distance of the skin of the patient below the screen as found on the scale 45 of the skin marker as shown in Fig. 5, and described above. By so placing the pointer along the scale, the depth will be subtracted from measurement found on scale 48, as will be further described. The pointer is retained at this setting by tightening the thumb screw 51.

It will be noted, as described above, that the scale 48 is graduated, from a zero point at each end, with numerals which increase toward the center, since the movement of the carriage is inversely proportional to the depth (b) (Fig. 8) of the foreign body from the screen.

After setting the pointer 49 as stated, the carriage is now moved to the right until the shadow of the foreign body is projected upon the crosslines 40. The scale, which has moved with the carriage, is now read at the pointer setting and the distance indicated thereon is the direct measurement of the depth of the foreign body beneath the surface of the skin, or the distance (b) as shown in Fig. 8, minus the distance measured on the skin marker scale 45.

Whereas in the foregoing certain elements have been described as best adapted to perform the functions allotted to them, nevertheless it is to be understood that various changes may be made therein without departing from the spirit or scope of the invention.

Having described our invention, what we claim as new and wish to secure by Letters Patent is:

1. An apparatus for determining the location of foreign bodies by means of X-rays, comprising a track, means supporting said track, a movable carriage mounted upon said track, means in connection with said carriage adapted to support a screen, provided with a central and equally spaced lineally arranged marker points above said track, and an X-ray tube with its target directly beneath said central marker point, the screen, the carriage and the tube being arranged in superimposed and fixed relation and operable as a unit, a scale connected to said carriage and a pointer slideably mounted on one of said tracks and cooperating with said scale to measure the movement of said carriage.

2. An apparatus for determining the location of foreign bodies by means of X-rays comprising a track, means supporting said track, a movable carriage mounted upon said track, means laterally movable on said carriage adapted to support a screen, having a central and equally spaced lineally arranged marker points, above said track, and an X-ray tube with its target directly beneath said central marker point, the screen, the carriage and the tube being arranged in superimposed and fixed relation and operable as a unit, a scale connected to said carriage and a pointer slideably mounted on one of said tracks and cooperating with said scale to measure the movement of said carriage.

3. An apparatus for determining the location of foreign objects imbedded within the body of a patient, comprising a body supporting base, a carriage longitudinally movable with respect to said base, a frame laterally movable on said carriage, means in connection with said frame for supporting a screen provided with a central and longitudinally spaced marker points, above said body, and an X-ray tube below said body, with the target of said tube beneath said central marker point, the screen, the carriage and the tube being arranged in superimposed and fixed relation and operable as a unit, and a scale adapted to measure the longitudinal movement between points of alignment between the target, the foreign object, and the longitudinally spaced marker points on said screen to determine the distance between the screen and said foreign object.

4. An apparatus for determining the location of foreign objects imbedded within the body of a patient, comprising a body supporting base, a carriage longitudinally movable with respect to said base, a frame laterally movable on said carriage, means for supporting a screen provided with a central and longitudinally spaced marker points, above said body, and an X-ray tube below said body with the target of said tube beneath said central marker point, the screen, the carriage and the tube being arranged in superimposed and fixed relation and operable as a unit, a vertically adjustable skin marker connected with said screen, a scale for measuring the degree of adjustment of said skin marker to determine the distance between the screen and the body of the patient, and a scale adapted to measure the longitudinal movement between points of alignment between the target, the foreign object, and the longitudinally spaced marker points on said screen to determine distance between the screen and said foreign object.

5. A method for localizing a foreign object imbedded within a body penetrable to X-rays which consists in casting a shadow of said object by a source of X-radiation upon a fixed point on a screen, moving the source of X-radiation and screen as a unit in a straight line in the plane of said screen and casting a second shadow of said object by said source of X-radiation upon another fixed point on said screen at a predetermined distance from said first-named point, and measuring the extent of movement of said screen and source of X-radiation and subtracting the distance from the screen to the surface of the body above said foreign object to determine the depth of the object beneath the upper surface of the body.

6. An apparatus for determining the location of foreign bodies by means of X-rays, comprising a track, means supporting said track, a projecting assembly including, a screen having aligned cross-marks spaced at predetermined distances thereon, a carriage mounted upon said track, and a source of X-ray emanation arranged in superimposed and fixed relation and operable as a unit, and a measuring device in connection with said carriage and said track adapted to indicate the movement of said carriage thereon between shadow projections of said foreign bodies upon the cross-marks on said screen.

7. An apparatus for determining the location of foreign bodies by means of X-rays, comprising a track, means supporting said track, a projecting assembly including a screen having aligned cross-marks spaced at predetermined distances thereon, a carriage mounted upon said track, and a source of X-ray emanation arranged in superimposed and fixed relation, and operable as a unit, and a measuring device including a scale connected to said carriage and a pointer slidably mounted on said track and cooperating with said scale to measure the movement of said carriage between shadow projections of said foreign bodies upon the cross-marks on said screen.

ALFRED A. DE LORIMIER.
LAWRENCE F. BLACK.
ROY C. DAY.